Figure 1:
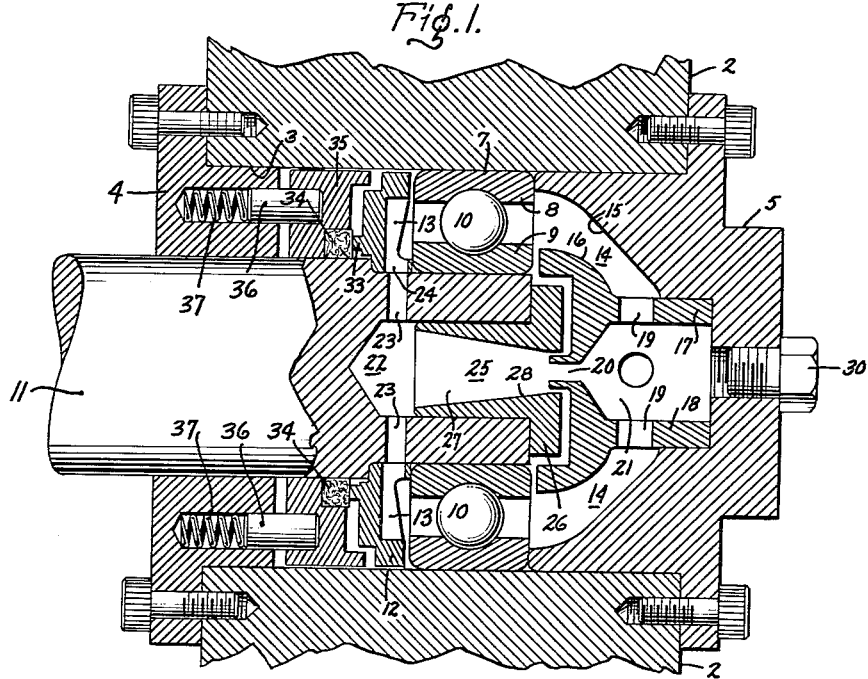

May 21, 1963  P. LEWIS ETAL  3,090,656

RECIRCULATING LUBRICATION SYSTEM
Filed Feb. 27, 1961

Inventors
Paul Lewis
Keith L. Streifert
by Paul A. Frank
Their Attorney

3,090,656
RECIRCULATING LUBRICATION SYSTEM
Paul Lewis, Scotia, and Keith L. Streifert, Schenectady, N.Y., assignors to General Electric Company, a corporation of New York
Filed Feb. 27, 1961, Ser. No. 92,022
4 Claims. (Cl. 308—187)

This invention relates to a recirculating lubrication system and, more particularly, to a recirculating lubrication system for use in high temperature environments.

In the aircraft and missile fields, it is very common for rotating members such as those found in electrical generators to experience unusually severe temperature conditions. For example, it is known that the skin temperature of an aircraft flying at Mach 2.5 may experience a skin temperature in excess of 700° F. It is appreciated that most lubricants are subject to oxidation and pyrolysis at such temperatures leaving a residue of carbonaceous material which may cause bearing failure.

The severity of extremely high temperature conditions on lubricants may be better appreciated upon consideration of a well-accepted guide rule in the lubrication art, namely, that pyrolysis and oxidation reactions proceed at a rate which is a function of the temperature such that the rate of the reaction doubles with every 10° C. increase above 100° C. in temperature.

Recognizing this problem, various systems have been utilized to maintain lubrication of bearings at elevtaed temperatures, such as, once-through systems wherein liquid lubricant is passed through the bearing construction and discarded. In other systems the bearing is blanketed with an inert atmosphere to avoid oxidative degradation. It has been found that at these elevated temperatures, it is desirable to utilize grease lubricants which appear to have improved stability. These greases usually comprise a lubricant such as a silicone oil which maintains its viscosity at elevated temperatures mixed in a thickening agent which may be silica gel, or a dye stuff such as indanthrene.

In the previously mentioned high temperature application, it is desirable that a minimum amount of lubricant be used with a minimum of auxiliary equipment. For this reason, utilization of a once-through oil lubrication system supplied from an external source is not feasible. Similarly, the use of extensive auxiliary equipment for generating inert gas blankets which may protect only against oxidation is not feasible. For these reasons, grease lubricated bearings are favored for such applications. In determining the efficacy of a bearing and lubricant at high temperatures, a test has been devised wherein a 25 mm. bore ball bearing is rotated at 8,000 r.p.m. with a 50 lb. radial load and a 25 lb. axial load. The cycle of the test includes an 8-hour trial period at 250° F., 8 hours at 700° F., 7 hours at 250° F., and 1 hour as stop-and-cooling time. With a bearing packed with grease under these circumstances, failure usually occurs in less than one cycle. Utilizing an auxiliary grease supply adjacent the bearing, one cycle may be completed. A recirculating grease system constructed in accordance with the present invention provides reliable results for two to four cycles.

The chief object of the present inveniton is to provide an improved lubrication system for use in high temperature environments.

Another object of the invention is to provide a grease lubrication system for high temperature environments.

A still further object is to provide an improved compact unitary lubrication construction utilizing grease as a lubricant which is recirculated to permit extended high temperature operation.

These and other objects of our invention will become more readily perceived from the following description.

Briefly stated, the present invention is directed to a grease lubrication system including a housing having a rotor therein with bearing means for supporting the rotor in the housing. The rotor includes a cavity extending from the end portion thereof and having pump means associated therewith for passing grease into the cavity, the grease passing outwardly to an impeller which passes the grease axially through the bearing construction and to a passage for redirecting the lubricant to the cavity in the rotor.

Figure 2:
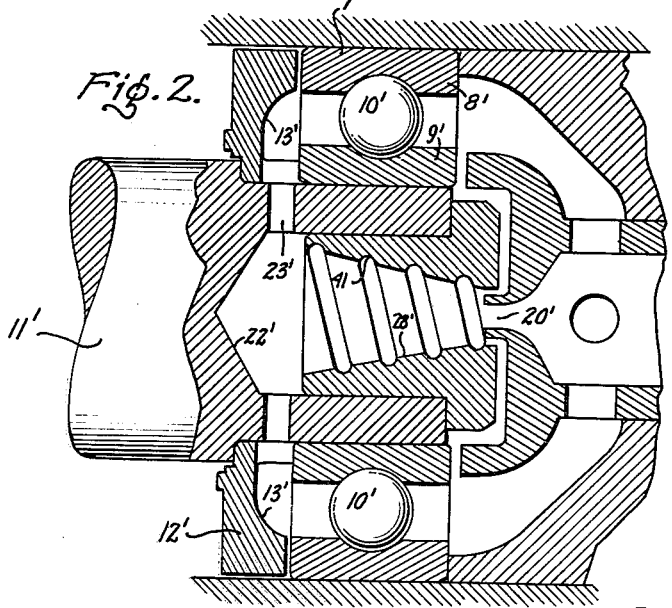

The attached drawings illustrate preferred embodiments of our invention in which:

FIGURE 1 is a sectional view of a lubrication system employing the present invention; and, FIGURE 2 is a fragmentary sectional view of the rotor and impeller of another embodiment of invention to be utilized in the housing illustrated in FIGURE 1.

In FIGURE 1 there is shown an embodiment of the invention utilized in an apparatus such as an aircraft electrical generator. Casing 2 of the generator may be provided with a substantially cylindrical opening 3 having located on one end thereof a flanged sleeve member 4 bolted to casing 2 and on the other side thereof a flanged closure member 5 may be also bolted to casing 2. The area adjacent opening 3 of casing 2 with sleeve member 4 and closure member 5 comprise a housing for the apparatus embodying the present invention. Within the housing may be located a suitable bearing which in the present embodiment is shown as ball bearing 7 having an outer race 8 mounted in the cylindrical opening 3 and an inner race 9 mounted on a rotor such as shaft 11. Antifriciton means may be provided in bearing 7 in the form of a plurality of ball members 10. It will be appreciated that other rolling elements may be utilized rather than ball members such as cylindrical rollers or tapered pins. If desired, a suitable journal bearing construction may be utilized in the housing rather than the rolling element type bearing. In order to supply lubricant to bearing 7, impeller 12 is provided adjacent thereto having a plurality of vanes 13 adapted to propel the lubricant in an axial direction into the space between outer race 8 and inner race 9. Preferably, grease lubricant is utilized such as previously described comprising a lubricant mixed with a suitable thickening agent, the grease supplying its lubricant content to lubricate the bearing. The grease is recirculated by being passed from the bearing in an axial direction into passage 14.

Passage 14 preferably comprises stationary walls to avoid any hydrodynamic pumping of lubricant passing therethrough. In this embodiment, outer wall 15 of passage 14 is provided by closure member 5. Inner wall 16 which with wall 15 defines the annular passage passing radially inward is provided by storage member 17. Storage member 17 includes a cylindrical portion 18 defining a chamber 21 having suitable openings 19 placing passage 14 in communication with the storage chamber. Storage chamber 21 has a central discharge opening 20 adapted to pass grease lubricant into cavity 22 concentrically formed in and extending from end of shaft 11.

If desired, plug 30 may be provided in the closure member 5 for the purpose of supplying lubricant into the storage chamber 21 thereby facilitating the provision of lubricant without requiring the breaking of the flange connection of closure member 5.

Lubricant passing from chamber 14 into storage chamber 21 is passed through opening 20 into cavity 22 and this lubricant is passed radially outwardly through radial passages 23 which are in alignment with openings 24 in impeller 12 thereby permitting lubricant in chamber 22 to be supplied to vanes 13 of impeller 12.

It has been found desirable to propel the lubricant from storage chamber 21 into cavity 22. For this purpose, pump member 25 may be supplied which is provided with a flange portion 26 engaging the end of shaft 11 and cylindrical portion 27 which defines a passage into cavity 22, and more specifically, to passages 23 extending radially outward. Pump member 25 also includes a suitable tapered surface 28 which expands in the direction of flow. This tapered surface when rotating defines a pump utilizing friction and centrifugal force to urge grease passing through opening 20 of storage member 17 to be passed in an axial direction to the inner portion of cavity 22 for subsequent removal through passages 23 and openings 24 to impeller 12. In this manner, the grease is recirculated through the bearing construction to make full use of the entire lubricant supplied in the grease. This device also serves to insure mixing of the grease thereby reducing the possibility of caking of the thickening agent utilized to compound the grease. Clearly, this mixing feature serves to maintain the lubricating quality of the grease and thereby extend the bearing life.

In the device described, it has been found that the impeller 12 passes the lubricant in an axial direction through bearing 7. However, it may be desired that a sealing device be provided to maintain the lubricant supplied within the cavity defined by the housing. For this purpose, impeller 12 may be provided with an annular sealing lip 33 which may engage a sealing ring 34 fabricated of carbon or other material, ring 34 being mounted in the retainer member 35 which is suitably restrained from rotation. Sleeve member 4 may restrain retainer member 35 by engaging pins 36 which extend from the retainer member. Retainer member 35 and sealing ring 34 may be urged by springs 37 acting on pins 36 into engagement with the sealing lip 33 of impeller 12.

Considering the operation of the invention described in the apparatus shown in FIGURE 1, lubricant from cavity 22 when shaft 11 rotates is centrifugally urged outwardly through radial extending passages 23 through openings 24 in impeller 12. This lubricant is centrifugally urged in passages 23 adjacent vanes 13 of rotating impeller 12 propelling lubricant axially through the space between outer race 8 and inner race 9 of bearing 7. The lubricant after lubricating the bearing surfaces is passed into passage 14 having stationary walls 15 and 16 to openings 19 in storage member 17. The lubricant enters storage chamber 21 and is discharged through opening 20 toward cavity 22. At the discharge outlet 20, it is desirable to further propel the grease to maintain circulation. For this purpose, tapered wall 28 centrifugally, by its rotation, pumps the grease in a axial direction into cavity 22 from whence it is expelled radially outwardly through passages 23 and openings 24 to impeller 12.

In FIGURE 2 there is shown a fragmentary sectional view of a portion of the apparatus shown in FIGURE 1 illustrating another embodiment of the invention. Shaft 11' has mounted thereon impeller 12'. In this embodiment of the invention, impeller 12' rather than being provided with a plurality of vanes 13 is provided with a conical surface 13' and pumping results due to friction forces generated by rotation of the impeller, the grease being pumped in an axial direction through bearing construction 7' to lubricate the surfaces of races 8' and 9' and ball members 10'. The lubricant continues to pass axially through the bearing and is returned to storage member 17 shown in FIGURE 1. On returning, the lubricant passing through opening 20' encounters tapered surface 28' which may be provided with helical indentations 41. Rotation of the helical indentations urges the grease to move in an axial direction toward cavity 22' to be discharged through radial passage 23' for recirculation by impeller 12' in a manner similar to that described with respect to FIGURE 1.

The present invention supplies a construction for operating at elevated temperatures in environments where space is extremely limited and a simple construction is desired which is not limited to any attitude. The system recirculates lubricant without requiring extensive protection for the lubricant or an extensive supply of lubricant. By recirculating the grease, the entire lubricant supply in the grease is utilized in such a manner as to achieve extended life in extremely high temperature environments. Furthermore, another aspect of the invention recognizes the thixotropic quality of certain lubricants. Lubricant is urged through cavity 22, its velocity is increased in passage 23 and then further increased by impeller 12. This increase in velocity may reduce the viscosity of the grease by increasing rates of shear to enhance the lubricating qualities of the grease in the system and reduce pumping losses.

As previously noted for a specific bearing, this system of recirculation permits reliable operation of 2–4 cycles for a loaded bearing construction operated at 250° F. for 8 hours, 700° F. for 8 hours, 250° F. for 7 hours and a period of cooling for 1 hour. It is also noted that without the recirculating feature, this particular cycle may not be completed. While the invention is described with particular reference to the utilization of a grease which will sustain operation at extremely high temperature, it will be appreciated that lubricating oils may be also utilized in less harsh temperature environments.

While we have described a preferred embodiment of our invention, it will be understood that our invention is not limited thereto, since it may be otherwise embodied within the scope of the appended claims.

What we claim as new and desire to secure by Letters Patent of the United States is:

1. In a lubrication system, the combination of a housing, a rotor, bearing means for rotatably supporting said rotor in said housing, means defining a cavity in said rotor and having a pumping means defined by a tapered portion of said cavity for passing lubricant through said cavity, said cavity being substantially enveloped by said bearing means, means having substantially stationary walls defining a passage from one side of said bearing means, a lubricant storage chamber disposed between said passage and said cavity to pass lubricant from the bearing means through said passage and said chamber into said cavity, an impeller located on the opposite side of said bearing means from said passage for axially propelling lubricant through said bearing means, and means defining a radially extending pasage through said rotor placing said cavity into communication with the area adjacent said impeller whereby lubricant supplied to the cavity is passed radially to said impeller for passage through the bearing means.

2. In a lubrication system, the combination of a housing, a rotor, bearing means for rotatably supporting said rotor in said housing, means defining a cavity in said rotor, said cavity terminating at the end of said rotor, pumping means defined by a tapered surface located in said cavity for passing lubricant therein, said cavity and pumping means being substantially enveloped by said bearing means, means having substantially stationary walls defining a passage from the said bearing means, a lubricant storage chamber connected between said passage and said cavity to pass lubricant from said bearing means through said passage and said chamber to the end of the rotor and terminating at the opening of said cavity, means defining a substantially radially extending passage from said cavity through said rotor, an impeller for passing lubricant through said bearing means, said impeler being located adjacent the passage means radially extending through said rotor from said cavity.

3. In a lubrication system, the combination of a housing, a rotor, bearing means for rotatably supporting said rotor in said housing, said bearing means including a plurality of rolling elements, means defining a cavity in said rotor, said cavity terminating at the end of said rotor and being substantially enveloped by said bearing means, an impeller for passing lubricant through said bearing means being located adjacent thereto, means having substantially stationary walls defining a passage extending from one side of the bearing means, a lubricant storage chamber connected between said passage and terminating adjacent the cavity in said rotor, pumping means defined by a tapered portion of said cavity for propelling lubricant from the last mentioned passage through said chamber and into said cavity, and means defining a passage extending radially through said rotor for passing lubricant from said cavity to said impeller.

4. In a lubrication system, the combination of a housing, a rotor, bearing means having a plurality of rolling elements for rotatably supporting said rotor in said housing, means defining a cavity extending from the end of the rotor into said rotor and being substantially enveloped by said bearing means, passage means having substantially stationary walls being located on one side of said bearing means, a lubricant storage chamber connected adjacent said passage and extending to said cavity, an impeller located on the opposite side of said bearing means for propelling lubricant through said bearing means, pump means associated with said rotor and being defined by a tapered portion in said cavity for propelling lubricant from said passage into said cavity, and radially extending passage means extending from said cavity to said impeller whereby lubricant is passed from said cavity to said impeller to be passed through said bearing means and returned to said cavity through said passage having stationary walls.

References Cited in the file of this patent

UNITED STATES PATENTS 2,062,920     Mapes et al. _____ Dec. 1, 1936

FOREIGN PATENTS 1,208,173     France _____ Sept. 7, 1959